UNITED STATES PATENT OFFICE.

HENRY MATHEY, OF NEW YORK, N. Y.

MANUFACTURE OF LIME.

SPECIFICATION forming part of Letters Patent No. 330,603, dated November 17, 1885.

Application filed September 22, 1885. Serial No. 177,860. (No specimens.)

*To all whom it may concern:*

Be it known that I, HENRY MATHEY, a citizen of the United States, residing at New York, in the county of New York and State of New York, have invented certain new and useful Improvements in the Manufacture of Lime; and I do hereby declare that the following is a full, clear, and exact description of the invention, which as will enable others skilled in the art to which it appertains to make and use the same.

My invention relates to the manufacture of limes and improved methods for manufacturing them. Heretofore lime-rock has been burned in vertical kilns, and as the stone is broken irregularly and of uneven size the burning must of necessity be ununiform and the product obtained varying in quality. Again, limestone when burned in a kiln or by means of a vertical feed and discharge is mixed with the products of combustion, and causes a portion of the lime from each kiln to be of an inferior quality. By my improved method the limestone is first crushed or ground to a size such as will pass through a No. 4 or 6 mesh screen. From the crusher it is conveyed to a revolving furnace—such as granted to me in Letters Patent September 1, 1885, No. 325,259—where it is burned. The revolving furnace brings all the crushed particles into a complete and constant exposure to the heat, and consequently produces a uniform burning, and as the furnace is free from the products of combustion the lime thus obtained is of a uniform strength and quality. In the ordinary methods of burning limestone there is an underburned and an overburned portion, which is caused by a non-control of the heat in all parts of the kiln. By my method I am enabled to overcome these difficulties. I also by this method diminish the handling, cost, and time of burning. I may burn the crushed stone under agitation in any other suitable way without departing from the spirit of my invention.

Having thus described my invention, what I claim as new, and desire to secure by Letters Patent, is—

1. The process for making lime which consists in first crushing the stone to a suitable degree of fineness, then burning the crushed or pulverized stone in a revolving cylinder, whereby the particles of the stone are subjected to a constant and uniform heat.

2. As a new article of manufacture, lime obtained by first crushing the limestone, and then burning under agitation the crushed particles.

In testimony whereof I have hereunto set my hand in presence of two witnesses.

HENRY MATHEY.

Witnesses:
R. W. HAWKESWORTH,
H. M. HAWKESWORTH.